(12) United States Patent
Takeda et al.

(10) Patent No.: US 10,873,742 B2
(45) Date of Patent: Dec. 22, 2020

(54) HEAD MOUNTED DISPLAY AND IMAGE FORMATION OPTICAL SYSTEM

(71) Applicant: SEIKO EPSON CORPORATION, Tokyo (JP)

(72) Inventors: Takashi Takeda, Suwa (JP); Akira Komatsu, Tatsuno-machi (JP); Masayuki Takagi, Matsumoto (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 66 days.

(21) Appl. No.: 15/899,399

(22) Filed: Feb. 20, 2018

(65) Prior Publication Data
US 2018/0249150 A1    Aug. 30, 2018

(30) Foreign Application Priority Data
Feb. 28, 2017    (JP) .................. 2017-035983

(51) Int. Cl.
| H04N 13/332 | (2018.01) |
| G02B 27/01 | (2006.01) |
| H04N 13/383 | (2018.01) |
| G02B 27/09 | (2006.01) |
| H04N 13/344 | (2018.01) |

(52) U.S. Cl.
CPC ....... *H04N 13/332* (2018.05); *G02B 27/0103* (2013.01); *G02B 27/0172* (2013.01); *G02B 27/0955* (2013.01); *H04N 13/344* (2018.05); *H04N 13/383* (2018.05); *G02B 2027/0105* (2013.01); *G02B 2027/0147* (2013.01); *G02B 2027/0178* (2013.01); *G02B 2027/0187* (2013.01); *H04N 2213/001* (2013.01)

(58) Field of Classification Search
CPC combination set(s) only.
See application file for complete search history.

(56) References Cited

U.S. PATENT DOCUMENTS

| 7,777,766 | B2 | 8/2010 | Okumura et al. | |
| 10,456,041 | B2* | 10/2019 | Ryu | G16H 40/63 |
| 2007/0229557 | A1* | 10/2007 | Okumura | G09G 5/00 345/698 |
| 2018/0007312 | A1* | 1/2018 | Ogino | H04B 10/25 |

FOREIGN PATENT DOCUMENTS

| JP | H06-282245 A | 10/1994 |
| JP | H08-313843 A | 11/1996 |
| JP | 2868389 B2 | 3/1999 |
| JP | 2896291 B2 | 5/1999 |
| JP | 4825561 B2 | 11/2011 |
| JP | 5268271 B2 | 8/2013 |

OTHER PUBLICATIONS

JP,08-313843,A(1996) Iwamoto Kazuyo English Machine translation (Year: 1996).*

* cited by examiner

*Primary Examiner* — Van N Chow
(74) *Attorney, Agent, or Firm* — Oliff PLC

(57) ABSTRACT

In a head mounted display, an image is displayed with central resolution higher than peripheral resolution or the peripheral resolution is not necessarily high resolution, and a controller changes the display aspect of the image formed by an image formation apparatus in accordance with a change in the sightline detected with a sightline sensor.

14 Claims, 13 Drawing Sheets

HEAD MOUNTED DISPLAY AND IMAGE FORMATION OPTICAL SYSTEM

BACKGROUND

1. Technical Field

The present invention relates to a head mounted display that is mounted on a viewer's head and presents video images formed by a video element or any other component to the viewer and further to an image formation optical system.

2. Related Art

As a head mounted display (hereinafter also referred to as HMD) (or virtual image display) mounted on a viewer's head, there is a known head mounted display that follows the sightline and displays narrow-visual-field video images at a point of fixation at high resolution (see JP-A-8-313843).

The HMD shown in JP-A-8-313843, however, requires an elaborate apparatus in front of the eyes and needs to drive the apparatus, and it is not always easy for the HMD to achieve, for example, a configuration that allows a see-through optical system and reduce the weight of the optical system, such as size reduction and simplification thereof.

SUMMARY

An advantage of some aspects of the invention is to provide a head mounted display that not only allows reduction in the burden on an optical system to allow simplification and size reduction of the optical system but allows satisfactory visual recognition of an image to be maintained and further provide an image formation optical system that can be used in the head mounted display.

A head mounted display according to a first aspect of the invention includes an image display section that displays an image having resolution in a central image display area higher than resolution in a peripheral image display area, a sightline detection section that detects a sightline, and an image control section that changes a display aspect of the image displayed by the image display section when the sightline detection section detects that a sightline direction has changed by an angle greater than a predetermined value.

In the head mounted display described above, the image display section displays an image having central resolution higher than peripheral resolution or the peripheral resolution is not necessarily high resolution, and the image control section changes the display aspect of the image displayed by the image display section in accordance with a change in the sightline detected by the sightline detection section, whereby satisfactory visual recognition of an image can be maintained with the head mounted display simplified and reduced in size.

In a specific aspect of the invention, the image display section displays an image at resolution higher than resolution converted from eyesight corresponding to an assumed visual field of an eye. In this case, satisfactory visual recognition of the image can be maintained without causing a viewer not to feel image degradation.

In another aspect of the invention, the image display section displays a central image in the central image display area having an angular range of at least 5° with respect to a sightline reference axis corresponding to the sightline direction of an eye. In this case, high resolution can be maintained over a range corresponding to a range over which a viewer can recognize numerals and letters.

Instill another aspect of described above, the head mounted display further includes a posture detection section that detects a posture of the head mounted display, and the image control section changes the display aspect of an image displayed by the image display section in correspondence with a change in the posture detected by the posture detection section in a case where the sightline detection section detects that the sightline direction has changed by an angle greater than or equal to 5°. In this case, the display aspect can be changed naturally for the viewer in correspondence with the change in the posture.

In still another aspect of the invention, the image control section changes how to change the display aspect of an image displayed by the image display section in response to a change in a sightline direction in accordance with an image content. In this case, an appropriate image can be displayed in accordance with the image content.

In still another aspect of the invention, the image display section has a pixel matrix, and out of a plurality of pixels that form the pixel matrix, pixels corresponding to the central image display area and pixels corresponding to the peripheral image display area have different pixel structures or are controlled differently. In this case, the burden on the control of the pixel matrix can be reduced.

In still another aspect of the invention, out of the pixels that form the pixel matrix, the image display section drives the pixels corresponding to the central image display area on a pixel basis and drives the pixels corresponding to the peripheral image display area on a pixel unit basis, the pixel unit formed of a plurality of adjacent pixels. In this case, the pixel drive control can be simplified.

In still another aspect of the invention, the image display section displays an image based on area scanning and adjusts a scanning speed in accordance with a type of the image display area. In this case, the resolution can be adjusted by adjusting the scanning speed.

In still another aspect of the invention, the image display section displays an image by using a hologram element. In this case, the burden on production of the hologram element can be reduced.

An image formation optical system according to another aspect of the invention is an image formation optical system that forms an image having central resolution and peripheral resolution different from each other according to a change in eyesight in relation to a visual field of an eye. The resolution of a central image within a predetermined angular range with respect to a sightline reference axis corresponding to a sightline direction of the eye is higher than the resolution of a peripheral image outside the predetermined angular range, and the resolution of the peripheral image is set to be higher than resolution converted from the eyesight corresponding to an assumed visual field of the eye.

The image formation optical system described above, which displays an image having central resolution and peripheral resolution different from each other according to a change in the eyesight in relation to the visual field of the eye in such a way that the resolution of the central image within the predetermined angular range with respect to the reference sightline detection corresponding to the sightline direction of the eye is set to be higher than the resolution of the peripheral image outside the predetermined angular range and the resolution of the peripheral image is set to be higher than the resolution converted from the eyesight corresponding to an assumed visual field of the eye, allows satisfactory visual recognition of the image to be maintained and the head mounted display to be simplified and reduced in size under the condition that the peripheral resolution is not necessarily high resolution.

In a specific aspect of the invention, the central image displayed by the image formation optical system falls within an angular range greater than or equal to 5° with respect to the sightline reference axis. In this case, high resolution can be maintained over the range corresponding to the range over which the viewer can recognize numerals and letters.

A head mounted display according to a second aspect of the invention includes any of the image formation optical systems described above. In this case, satisfactory visual recognition of an image can be maintained with the head mounted display simplified and reduced in size.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
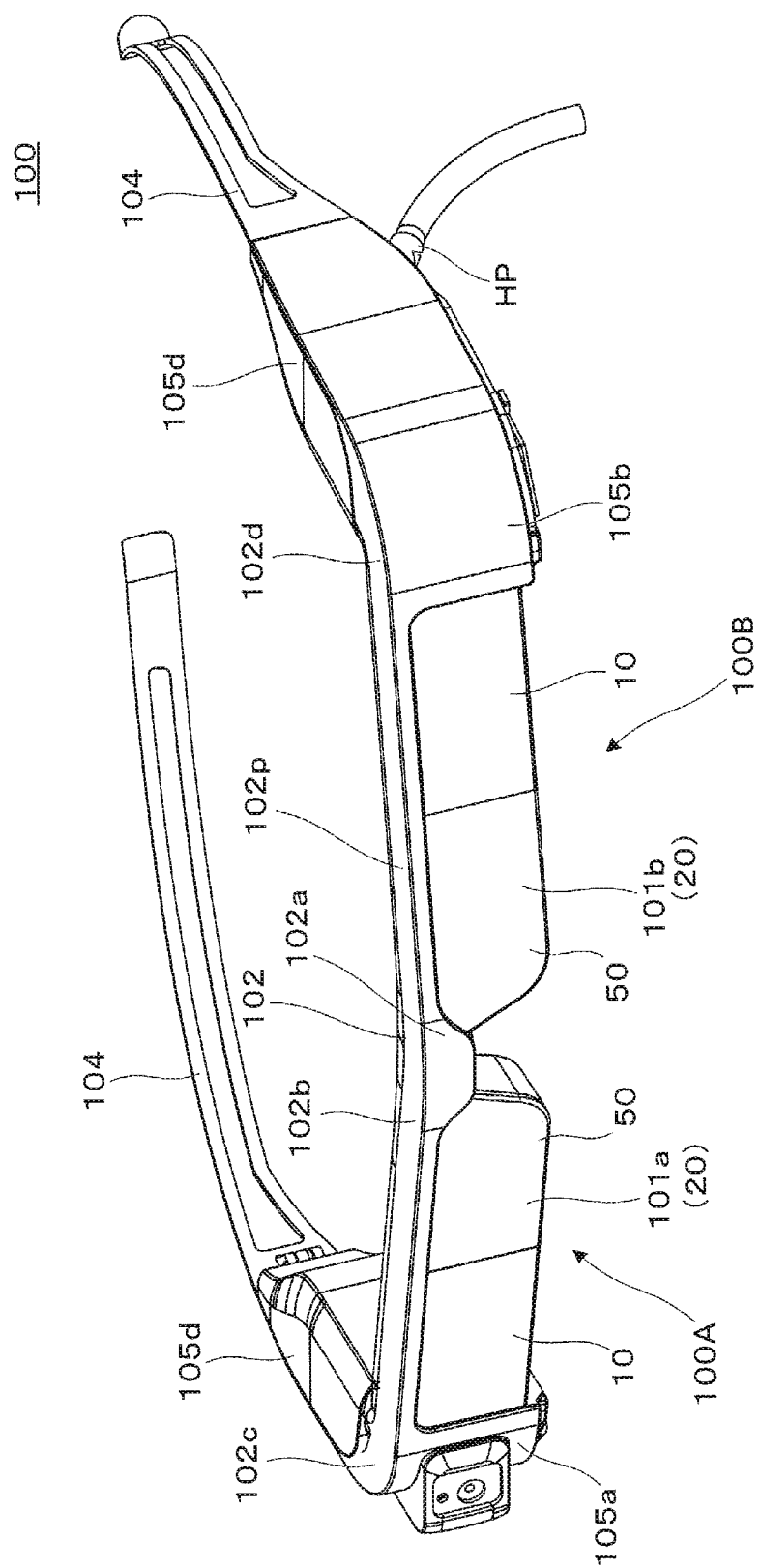
FIG. 1 is a perspective view for describing the exterior appearance of an example of a head mounted display according to a first embodiment.

A head mounted display according to a first embodiment of the invention will be described below in detail with reference to FIG. 1 and other figures.

A head mounted display 100 according to the present embodiment is not only a head mounted display (HMD) having a glasses-like exterior appearance but a virtual image display that not only allows viewer or a user on whom the head mounted display 100 is mounted to visually recognize image light (video light) in the form of a virtual image but allows the viewer to perform see-through visual recognition or observation of an outside image. The head mounted display 100 includes a first display apparatus 100A, a second display apparatus 100B, and a frame section 102. The head mounted display 100 further includes a variety of sensors and a control section as well as the first display apparatus 100A and other optical systems, and the variety of sensors and the control section will be described later in detail with reference to FIGS. 6A and 6B and other figures.

The first display apparatus 100A and the second display apparatus 100B are portions that form a virtual image for the right eye and a virtual image for the left eye, respectively, include first and second optical members 101a, 101b, which cover the front side of the viewer's eyes but allows see-through observation, and first and second image formation main bodies 105a, 105b, respectively, and the first display apparatus 100A and the second display apparatus 100B are each an image formation optical system that forms an image and are each an image display section that displays an image. The first and second image formation main bodies 105a, 105b, which will be described later, are each formed of a display apparatus (video element), a projection lens and other optical systems for image formation, a member that accommodates the optical systems, and other components. The display apparatus (video element), the projection lens, and the other optical systems are so covered with cover-shaped exterior members 105d as to be supported thereby and accommodated therein. The first and second optical members 101a, 101b are light guide portions that guide video light formed by the first and second image formation main bodies 105a, 105b and allow the viewer to visually recognize outside light and the video light superimposed on each other, and the first and second optical members 101a, 101b each form a light guide apparatus. The first optical member 101a or the second optical member 101b is also referred to as a light guide apparatus 20. The first display apparatus 100A and the second display apparatus 100B each function as a virtual image display by itself.

The frame section 102 is an elongated member bent in a U-letter shape in a plan view and is a one-piece part made of a metal. The frame section 102 is made of a magnesium alloy by way of example in the description. That is, the frame section 102 includes a main body section 102p, which is a magnesium frame that is a metal one-piece part. The frame section 102 further includes a central section 102a, which has a thick structure and is so provided as to be connected to both the first optical member 101a and the second optical member 101b (light guide apparatus 20, which is a pair of light guide portions), and a support body 102b, which extends from the central section 102a along the first and second optical members 101a, 101b and forms portions each bent in a U-letter shape.

The central section 102a is sandwiched by ends of the first and second optical members 101a, 101b to fix them relative to each other. In addition, the support body 102b forms first and second peripheral sections 102c, 102d, which are portions each bent in a U-letter shape, and the first and second peripheral sections 102c, 102d are connected (assembled) to the first and second optical members 101a, 101b, whereby the first and second optical members 101a, 101b are further fixed to each other.

Temples 104, which are bows extending backward from the right and left ends of the frame section 102, are provided and so allowed to come into contact with the viewer's ears, temporal portions, or other sites as to support the frame section 102. The first and second image formation main bodies 105*a*, 105*b* may be attached to portions that form part of the frame section 102 and the temples 104.

Figure 2A:
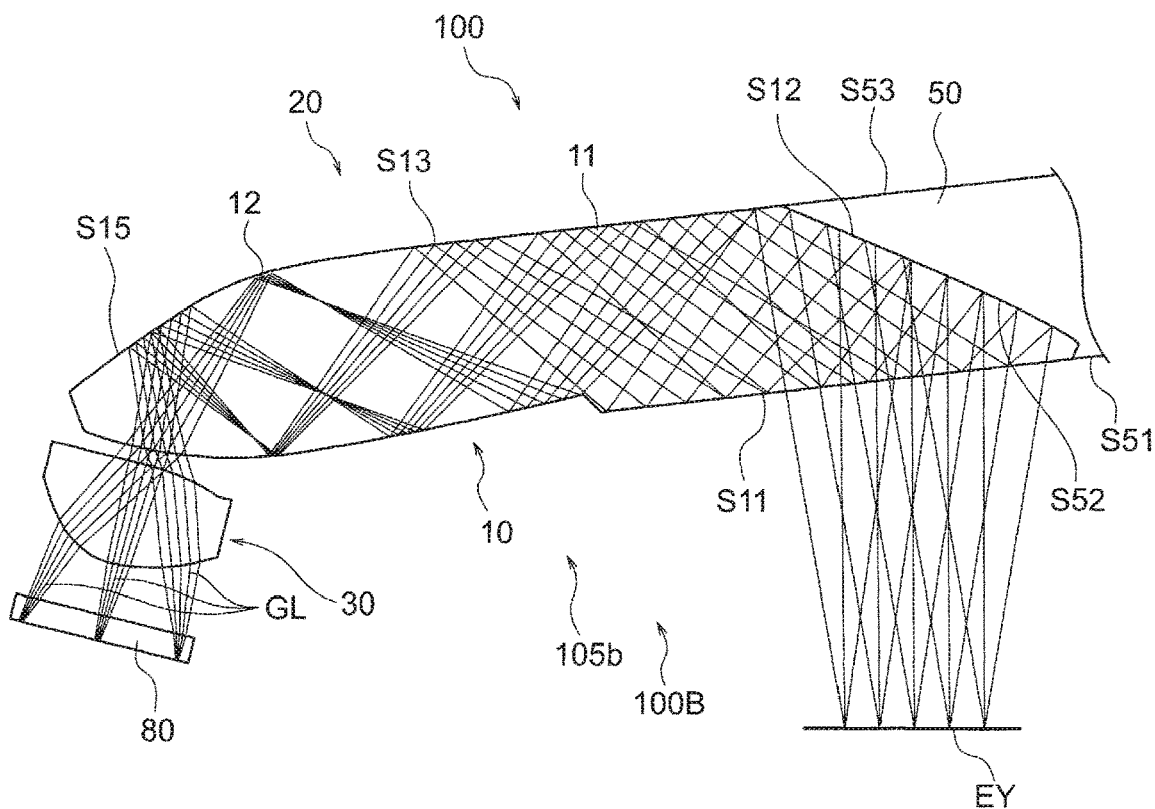
FIG. 2A conceptually describes the optical path of video light in the head mounted display.

An example of the structure and other configurations in which the head mounted display 100 guides the video light will be conceptually described below with reference to FIGS. 2A and 2B and other figures. The apparatus for guiding the video light is the first display apparatus 100A and the second display apparatus 100B (see FIG. 1 and other figures), as described above, and the first display apparatus 100A and the second display apparatus 100B are bilaterally symmetric and have the same structure. In FIG. 2A, only the second display apparatus 100B will therefore be described, and the first display apparatus 100A will not be described. The second display apparatus 100B includes an image display apparatus 80, which forms the video light, an image forming projection lens 30, which is accommodated in a lens barrel, and the light guide apparatus 20, which guides the video light having exited from the image display apparatus 80 and passed through the projection lens 30, as shown in FIG. 2A. The light guide apparatus 20 is formed of a light guide member 10 for light guidance and see-through observation and a light transmissive member 50 for see-through observation.

The image display apparatus 80 can be a video element (video display element) formed, for example, of an organic EL element or any other self-luminous element. The image display apparatus 80 may instead, for example, be configured to include a video display element (video element) that is a transmissive spatial light modulator, an illuminator (not shown) that is a backlight that emits illumination light to the video display element, and a drive control section (not shown) that controls the action of each of the video display element and the illuminator.

The projection lens 30 is a projection system including, for example, an optical element (lens) placed as a component along the light-incident-side optical axis. In the description, the projection lens 30 is a single lens. The optical element, for example, has an aspheric surface that is not axially symmetric (non-axially symmetric aspheric surface) and can cooperate with part of the light guide member 10, which forms the light guide apparatus 20, to form an intermediate image corresponding to a displayed image in the light guide member 10. The projection lens 30 causes the video light formed by the image formation apparatus 80 to be projected toward and incident on the light guide apparatus 20.

The light guide apparatus 20 is formed of the light guide member 10 for light guidance and see-through observation and the light transmissive member 50 for see-through observation, as described above. The light transmissive member 50 is a member that assists the see-through observation function of the light guide member 10 (assistant optical block) and integrated with and fixed to the light guide member 10 into the single light guide apparatus 20. The projection lens 30 and the light guide apparatus 20 are attached to the lens barrel (not shown) to form an integrated, unitized part, which is called an optical display unit.

The light guide member 10 has first to fifth surfaces S11 to S15 as side surfaces each having an optical function. Among the surfaces, the first surface S11 and the fourth surface S14 are continuously adjacent to each other, and the third surface S13 and the fifth surface S15 are continuously adjacent to each other. The second surface S12 is disposed between the first surface S11 and the third surface S13. The front side of the second surface S12 is provided with and accompanied by a half-silvered mirror layer. The half-silvered mirror layer is a reflection film having light transparency (that is, a semi-transmissive/semi-reflective film), is formed by depositing a metal reflection film or a dielectric multilayer film, and has appropriately set video light reflectance.

The optical path of the video light (video light GL in the description) will be schematically described below with reference to FIG. 2A. The light guide member 10 allows the video light GL to be incident thereon through the projection lens 30 and guides the video light GL toward the viewer's eye on the basis of reflection at the first to fifth surfaces S11 to S15 and other type of optical behavior. Specifically, the video light GL having passed through the projection lens 30 is incident on the fourth surface S14, reflected off the fifth surface S15, internally incident again on and totally reflected off the fourth surface S14, incident on and totally reflected off the third surface S13, and incident on and totally reflected off the first surface S11. The video light GL totally reflected off the first surface S11 is incident on the second surface S12 and partially reflected off the half-silvered mirror layer provided on the second surface S12 while partially passing therethrough, is incident again on the first surface S11, and passes therethrough. The video light GL having passed through the first surface S11 is incident as a roughly parallelized light flux on the viewer's eye EY or a position equivalent thereto. That is, the viewer views an image produced by the image light in the form of a virtual image.

The light transmissive member 50 is integrated with and fixed to the light guide member 10 into one light guide apparatus 20 and is a member that assists the see-through observation function of the light guide member 10 (assistant optical block), as described above. The light transmissive member 50 has a first transmissive surface S51, a second transmissive surface S52, and a third transmissive surface S53 as side surfaces each having an optical function. The second transmissive surface S52 is disposed between the first transmissive surface S51 and the third transmissive surface S53. The first transmissive surface S51 is a surface that is an extension of the first surface S11 of the light guide member 10, the second transmissive surface S52 is a curved surface that is bonded to and integrated with the second surface S12, and the third transmissive surface S53 is a surface that is an extension of the third surface S13 of the light guide member 10.

The light guide apparatus 20 not only allows the viewer to visually recognize the video light via the light guide member 10, as described above, but allows, in the form of cooperation between the light guide member 10 and the light transmissive member 50, the viewer to view an outside image having only a small amount of distortion. In this process, since the third surface S13 and the first surface S11 are flat surfaces roughly parallel to each other (diopter is roughly zero), the outside light hardly suffers from aberrations and other disadvantageous effects. Similarly, the third transmissive surface S53 and the first transmissive surface S51 are flat surfaces roughly parallel to each other. Further, since the third transmissive surface S53 and the first surface S11 are flat surfaces roughly parallel to each other, aberrations and other disadvantageous effects therefore hardly occur. The viewer therefore views a distortion-free outside image through the light transmissive member 50.

Figure 2B:
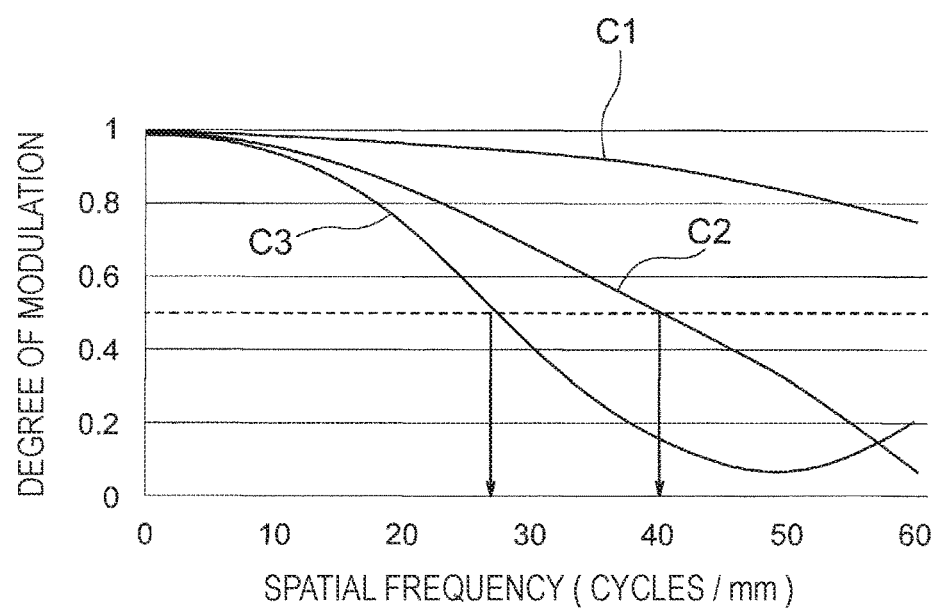
FIG. 2B is an MTF diagram showing the MTF of the optical system shown in FIG. 2A.

FIG. 2B is an MTF diagram showing the MTF of the first display apparatus 100A and the second display apparatus 100B, each of which includes the light guide apparatus 20 and the projection lens 30 having the configurations described above.

In the optical system that guides the video light in the present embodiment, the resolution at the periphery is no higher than half the resolution at the center, as shown in FIG. 2B. Specifically, as compared with an MTF curve C1 relating to the video light at the center, an MTF curve C2 relating to the video light in a region close to the periphery where the viewing angle ranges from 5° to 10° and an MTF curve C3 relating to the video light in the outermost region where the viewing angle ranges from 15° to 20° show poor resolution. However, even in the case of the MTF curves C2 and C3, maintaining, for example, a contrast of at least 50% and a resolution of about 40 lp/mm in the case of the MTF curve C2 and maintaining, for example, a contrast of at least 50% and a resolution of about 28 lp/mm in the case of the MTF curve C3 can maintain resolution higher than the visual resolution derived from a visual resolving power curve. The relationship between the performance of the optical system and the visual resolving power (corresponding to eyesight) will be described later in detail.

Figure 3:
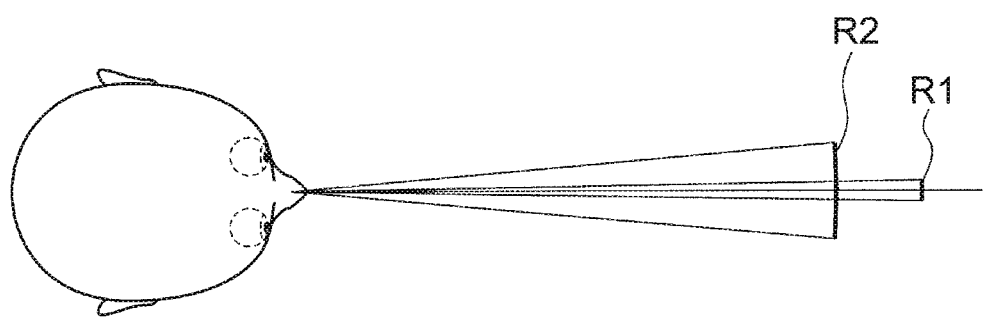
FIG. 3 describes the human visual characteristics.
Figure 4A:
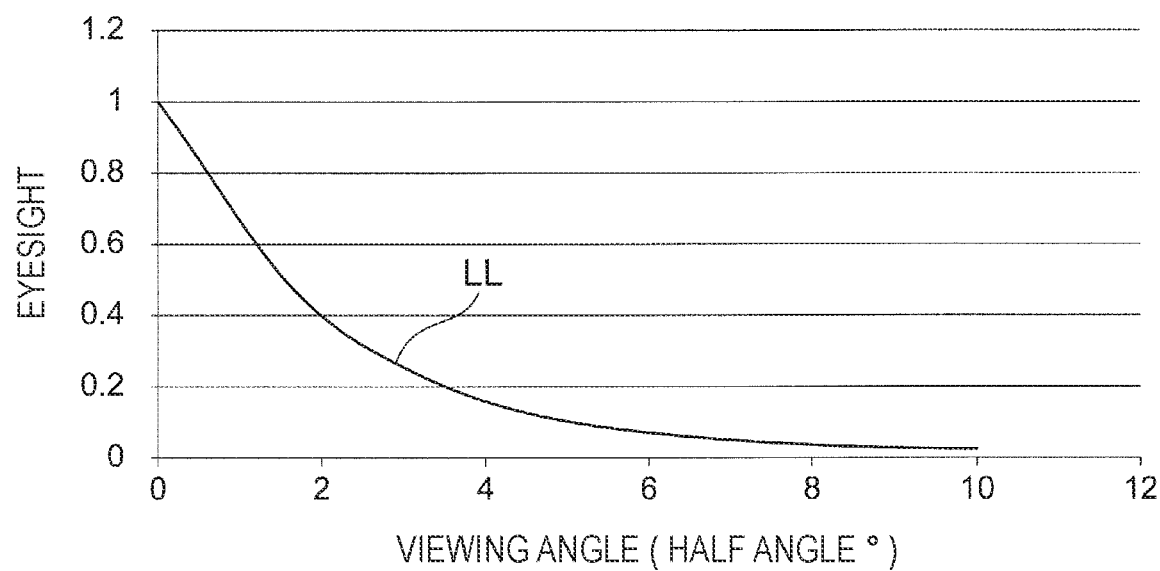
FIG. 4A shows a graph illustrating the eyesight in relation to the visual field of an eye.

As an assumption for describing the relationship between the performance of the optical system and the performance of a human eye, the characteristics of a human eye will be described below. FIG. 3 describes the human visual characteristics, and FIG. 4A is a graph showing the eyesight in relation to the visual field of an eye. Out of the human viewing angle (half angle) in the rightward/leftward direction, which is the direction in which the eyes are arranged, a range R1, where a retina image is formed at the fovea centralis so that high-resolution central vision is achieved, is about 1° at the maximum, and the range where resolution to some extent or higher can be maintained even with an eyesight of about 1.0 is about 2° at the maximum, as shown in FIG. 3. The resolution performance sharply drops at viewing angles greater than about 2°. Further, a range R2, where numerals and letters can be recognized, is about 5° at the maximum. Specifically, the human eyesight sharply drops as the viewing angle increases, as indicated by the curve LL in FIG. 4A.

In view of the visual characteristics described above, to gaze at an object at high resolution, a person moves the body in such a way that the person views the object by using the center of each of the eyes. Specifically, to view a portion at which the person desires to gaze, the person first rotates the eyeballs to move the sightline so that the person views the target to be visually recognized by using the center of each of the eyes, and the person then moves the neck in such a way that the target to be visually recognized, which is the portion that the person desires to view, is located on the center axis of the face.

In contrast, in the present embodiment, in view of the aforementioned eyesight characteristics in relation to the visual field of an eye, to maintain the resolution higher than the resolution derived from the visual resolving power curve, image display is performed as follows: high resolution is maintained over a central range at least containing the range where the eye can perform central vision; and resolution no higher than half the resolution at the center but at least higher than the visual resolution performance is maintained over a peripheral range which is separate from the center and where the visual resolution performance drops, so that the viewer can recognize an image that does not cause the viewer to sense a decrease in resolution but allows the viewer to sense that the image is sufficiently highly resolved.

Further, image processing according to the movement of the human eyes and other portions is performed, as will be described later.

Figure 4B:
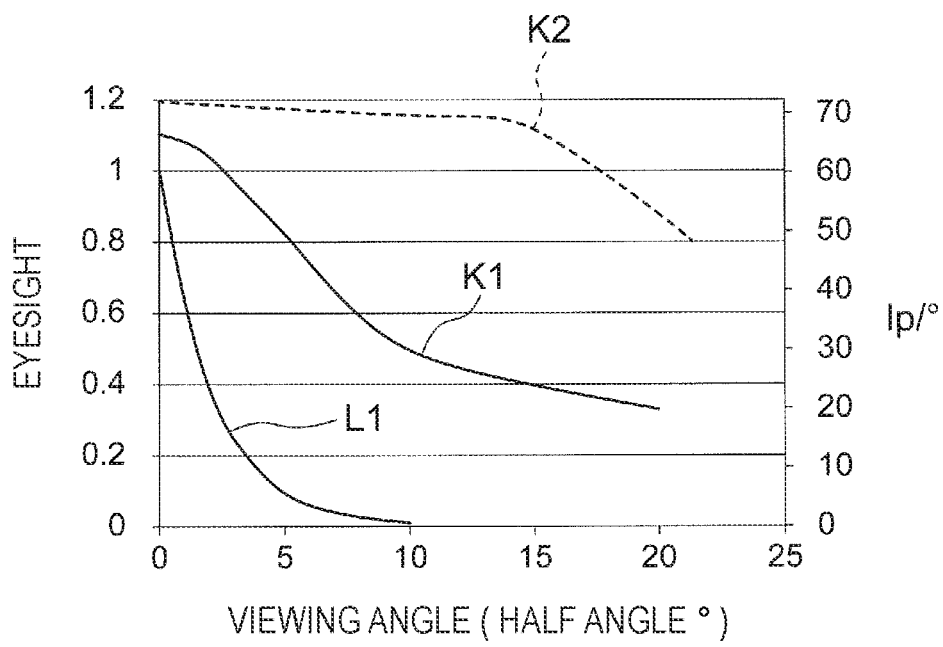
FIG. 4B shows graphs for comparing the eyesight characteristics in relation to the visual field of an eye and the optical characteristics of the head mounted display.

FIG. 4B shows graphs for comparing the eyesight characteristics in relation to the visual field of an eye and the optical characteristics of the head mounted display 100. The optical characteristics of the head mounted display 100 have been shown in the form of the MTF diagram of FIG. 2B, as described above. For example, over the range where a human eye can perform central vision, which excels in resolution, or the range of about 1°, the MTF curve C1 relating to the corresponding central video light shows that very high resolution is maintained, whereas the MTF curve C2 relating to the video light in a region close to the periphery and the MTF curve C3 relating to the video light in the outermost region show poor resolution, as shown and described in FIG. 2B. The curve K1 in FIG. 4B corresponds to the MTF curves in FIG. 2B.

Each of the curves of the graphs shown in FIG. 4B will be described below. The resolution of the optical system can be considered as follows: First, assume a situation in which the half viewing angle is about 23° corresponding to the viewing angle in a case where an image of an 80-inch-equivalent screen having an aspect ratio of 16:9 and located at a distance of 2.5 m is viewed. In this case, the resolution necessary for an 80-inch, 1080-p image and expressed by using lp/° in place of lp/mm is about 50 lp/° in the vicinity of the center axis (in the vicinity of angle of 0°). That is, the assumed screen can be sufficiently visually recognized when resolution (unit: lp/°) higher than the resolution described above is maintained. The optical system in the present embodiment has relatively high resolution in the vicinity of the center axis but slightly poor resolution at the periphery, as shown in FIG. 2B. Specifically, in FIG. 4B, the curve K1 shows the performance of the optical system in the present embodiment, with the horizontal axis representing the viewing angle (half angle) and the vertical axis representing the performance along the markings lp/° shown on the right side. That is, the curve K1 represents the performance corresponding to the MTF diagram of FIG. 2B.

As for the eyesight, for example, an eyesight of 1.0 means a resolution performance (resolving power) of an angle (minute) of 1/60. This corresponds to 60 lp/° in terms of the resolution). (lp/°) indicated by the right-side markings in FIG. 4B. The resolution performance of a human eye, however, sharply drops as the viewing angle increases, as described with reference to FIG. 4A. The sharp drop is shown by the curve L1 in FIG. 4B, which corresponds to the curve LL in FIG. 4A assuming that the eyesight of 1.0 is converted into the resolution of 60 lp/°. That is, in FIG. 4B, the horizontal axis represents the viewing angle (half angle), and the vertical axis represents the eyesight not only in the form of the left-side markings, as in FIG. 4A, but in the form of the right-side markings lp/° on the assumption that (eyesight of 1.0)=(60 lp/°).

As described above, FIG. 4B, in which the curve L1 represents the resolution performance of a human eye, and the curve K1 represents the resolution performance of the optical system, allows comparison between the two types of resolution performance. In this case, the curve K1 shows that the performance decreases as the viewing angle increases, that is, with distance toward the periphery, but that the performance is always kept higher than that indicated by the curve L1, which shows the performance of an eye. That is, the head mounted display 100 can display an image at resolution higher than the resolution converted from the eyesight corresponding to an assumed visual field of an eye.

As described above, the burden on the optical system can be reduced by employing a configuration in which not only is the resolution maintained at least at a certain value high enough for a necessary level to prevent the viewer from sensing image degradation in consideration of the eyesight in relation to the visual field of a human eye but very high precision is not required. In the case presented above, an optical system having peripheral resolution about half of the central resolution can be employed, in particular, whereby the number of lenses and other components employed in the optical system can be reduced accordingly, so that the weight can reduced and lens surface precision can be lowered for cost reduction.

Figure 5A:
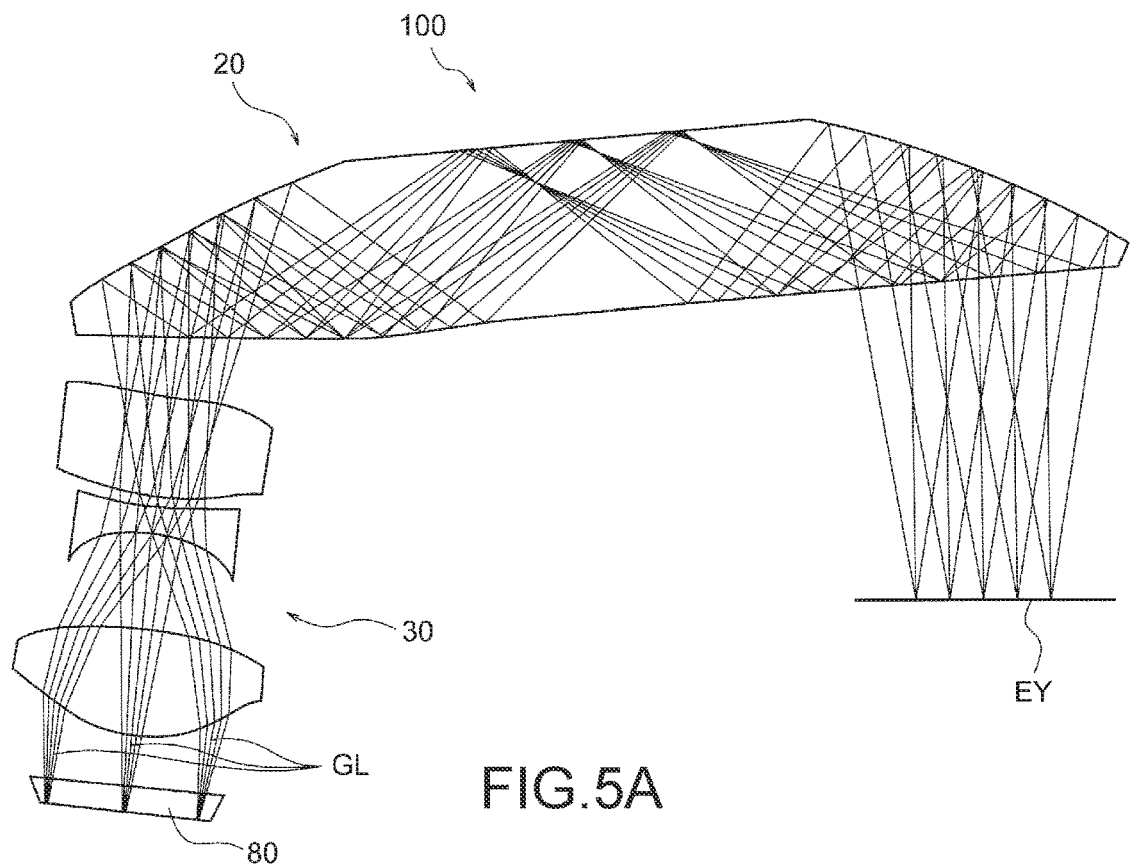
FIG. 5A conceptually describes the optical path of video light in Comparative Example.
Figure 5B:
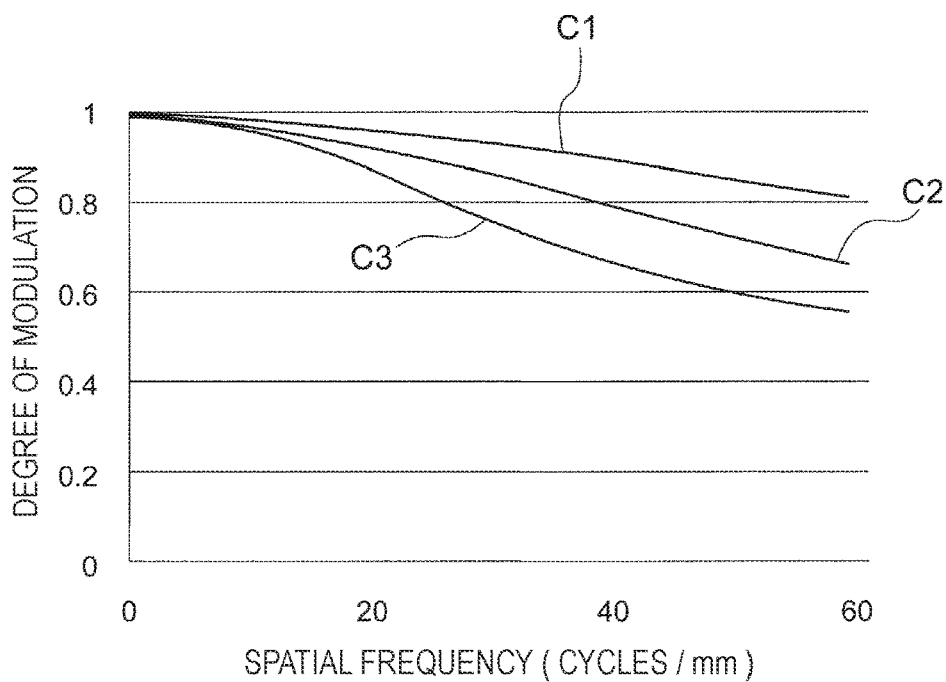
FIG. 5B is an MTF diagram showing the MTF of the optical system shown in FIG. 5A.

FIGS. 5A and 5B show an example of an optical system in Comparative Example to be compared with the optical system in the present embodiment shown in FIGS. 2A and 2B.

The optical system in Comparative Example differs from the optical system in the present embodiment, for example, in that the projection lens 30 is formed of three optical elements (lenses), as shown in FIG. 5A. It is therefore apparent that the MTF diagram of FIG. 5B is superior to the MTF diagram of FIG. 2B.

In related art, an optical system that maintains a state in which a displayed image has high resolution thereacross has been provided. It is therefore necessary to employ a complex, high-precision configuration in which a plurality of (three) optical elements are axially arranged, as shown, for example, in FIG. 5A. The resolution in Comparative Example is shown by the curve K2 drawn in the broken line in FIG. 4B. The optical system in Comparative Example is believed to be an overdesigned optical system from the viewpoint of the concept of the eyesight in relation to the visual field.

In contrast, in the present embodiment, in which the configuration of the optical system is simplified in accordance with the characteristics of a human eye, high-resolution visual recognition can be maintained with the configuration simplified.

Further, the head mounted display 100 according to the present embodiment makes use of the aforementioned nature of the movement of the human eyes and neck or head to move video images viewed in the sightline direction to the center at a speed roughly equal to the speed of the neck movement, whereby the viewer can view a portion that the viewer desires to view at high resolution with no discomfort.

Figure 6A:
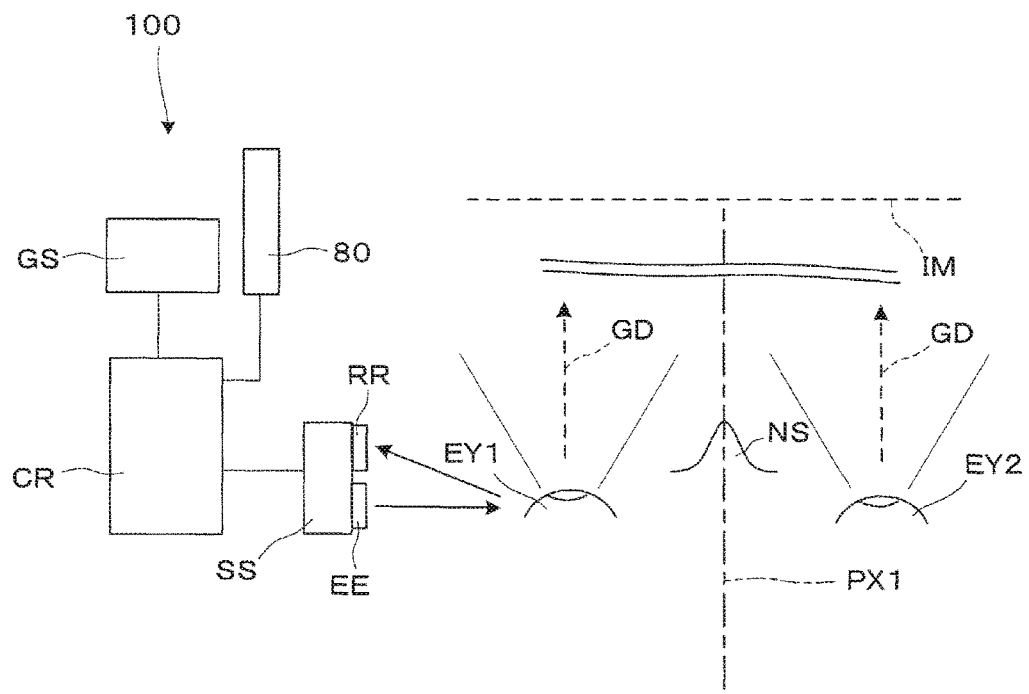
FIG. 6A describes an example of image control operation performed by the head mounted display.
Figure 6B:
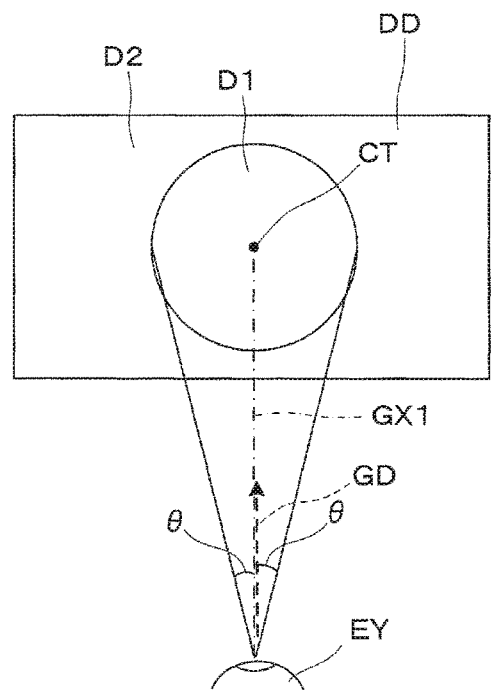
FIG. 6B describes the relationship between a displayed image and the sightline in the image control operation.

An example of image control operation performed by the head mounted display 100 according to the movement of the human eyes and neck or head will be described below with reference to FIGS. 6A, 6B, and 7. FIG. 6A describes an example of the image control operation performed by the head mounted display 100, and FIG. 6B describes the relationship between a displayed image and the sightline in the image control operation in the situation shown in FIG. 6A. In FIG. 6A, left and right eyes EY1, EY2 represent the viewer's eyes, and an eye EY in FIG. 6B representatively shows one of the pair of left and right eyes EY1, EY2. The eye EY or the left and right eyes EY1, EY2 are drawn to describe the position of the viewer's eyes, the sightline direction, and other factors of eye movement. That is, FIG. 6B conceptually shows the relationship between an image display area DD, which is an area where an image visually recognized by each of the eyes is displayed in the situation shown in FIG. 6A, and a sightline direction GD, which is the direction of the sightline of the eye EY. Further, in the description, out of the image display area DD, a central (middle) area where the resolution is relatively high is called a first image display area D1, and a peripheral area where the resolution is relatively low is called a second image display area D2. The first image display area D1 has a circular shape, but any of a variety of other shapes is conceivable as the shape of the first image display area D1.

The head mounted display 100 according to the present embodiment includes a variety of sensors and a control section as well as the optical systems described with reference to FIG. 1 and other figures, as shown in FIG. 6A and other figures. Specifically, the head mounted display 100 includes, as the variety of sensors, a sightline sensor SS, which is a sightline detection section that detects the sightline, a posture sensor GS, which is a posture detection section that detects the posture, and a controller CR, which is an image control section that performs image control on the basis of results of the detection performed by the sightline sensor SS and the posture sensor GS. The controller CR drives and controls the image display apparatus 80 to allow the image control.

The sightline sensor SS includes, for example, a light emitter EE and a light receiver RR and conceivably functions as the sightline detection section by causing the light emitter EE to apply weak infrared light onto the eyes EY1 and EY2 and the light receiver RR to capture the light reflected off the retina and cornea for detection of the sightline direction. A variety of specific methods that allow the sightline sensor SS to detect the sightline are known, and as a basic principle for sightline detection, out of the portions that form an eye, a moving portion, such as the iris and the pupil, is captured with respect to a non-moving portion, such as the inner corner of an eye and the corneal reflect.

The posture sensor GS is formed, for example, of a gyro sensor and detects acceleration or any other physical quantity to allow grasp of the viewer's posture, movement, and other factors, that is, allow grasp of the posture, movement, and other factors of the head mounted display 100 itself.

The controller CR captures the movement of the viewer's eyes EY1 and EY2 via the sightline sensor SS, and when the amount of movement of the eyes EY1 and EY2 is greater than or equal to a predetermined angle, the controller CR performs display control according to the movement. In the description, in particular, a change in an image, that is, how to drive and control the image display apparatus 80 to change an image is determined on the basis of a result of the detection performed by the posture sensor GS.

In the description, a posture reference axis PX1 is defined as an axis that is perpendicular to an image IM in the form of a virtual image, passes through the center of the optical system of the head mounted display 100 having the configuration formed of a pair of right and left portions, and further passes through a point between the viewer's left and right eyes EY1, EY2, that is, a point in the vicinity of the center of the nose NS in a plan view, as shown in FIG. 6A. In FIG. 6B, which corresponds to FIG. 6A, the posture reference axis PX1 corresponds to a sightline reference axis GX1, which is assumed to be the frontward direction in the optical system of the head mounted display 100. The sightline reference axis GX1 is an axis set on the basis of the positions and the sightline direction of a standard viewer's eyes assumed when the optical system of the head mounted display 100 is configured and so set that the center of the image is located on the sightline direction of the assumed eyes, and the sightline reference axis GX1 corresponds to the optical axis of the optical system. On the other hand, the posture reference axis PX1 is an axis perpendicular to the image IM, which is formed as a virtual image and visually recognized in the standard posture described above, and is assumed to be located in the middle position between the right and left eyes and in the height position of the assumed eyes. When the sightline direction GD, which is the direction of the sightline of the left and right eyes EY1, EY2 and indicated by the broken-line arrow, is an exactly or roughly frontward direction, as shown in FIG. 6A, the eyepoints face the center of the image IM in the form of a virtual image. The posture sensor GS, which is the posture detection section, can be considered as a section that captures and senses, for example, the movement of the posture reference axis PX1.

It can, in other words, be said that the axes PX1 and GX1 are a reference representing the in-apparatus position of an image formed by the optical system of the head mounted display 100 or a reference at the time of optical design. Specifically, on the assumption that the viewer's eyes EY1 and EY2 are located in a typical position, the direction GD of the sightline of the viewer who naturally faces frontward is parallel to the posture reference axis PX1 in a plan view, as shown in FIG. 6A, and causing the eyes EY drawn as the eyes EY1 and EY2 to face, along the sightline reference axis GX1, an image center CT as a virtual image allows the viewer to perform central view, in which excellent resolution is achieved over the range of about 1° with respect to the image center CT, as shown in FIG. 6B.

In the head mounted display 100, in view of the aforementioned description, the optical design is so performed that in the image display area DD, the first image display area D1 is a central range which is a circular range around the image center CT located on the sightline reference axis GX1, which is the optical axis of the optical system, and where the half viewing angle θ is 5° or an angle greater than or equal to 5° (10°, for example), as shown in FIG. 6B, and that the resolution in the first image display area D1 is higher than the resolution in the second image display area D2, which is the peripheral area or the area outside the first image display area D1. The degree of the resolution in the first image display area D1 is conceivably so set that in a case where an image of letters or numerals is displayed, for example, the MTF value is so maintained as to maintain resolution high enough to allow the viewer to read the letters or numerals.

The first image display area D1, which has an angular range greater than the angular range over which the central vision, which provides the viewer with excellent resolution, can be performed (about 1°), allows the viewer to visually recognize an image that causes the viewer to think that the image is satisfactory. Further, the first image display area D1, in which the half viewing angle θ is greater than or equal to 5°, ensures resolution high enough for an aspect in which high resolution is maintained over a range corresponding to a range over which the viewer can recognize numerals and letters so that the viewer can read the letters, for example, by moving only the eyes without moving the neck.

On the other hand, the second image display area D2, which is inferior to the first image display area D1 in terms of resolution but where the resolution better than a human's eyesight in relation to the visual field is maintained as described with reference to FIG. 4B, can prevent the viewer from being aware of the degradation in the resolution. That is, on the assumption that the eyesight in relation to the visual field of an eye shown in FIG. 4B is used, the resolution of a peripheral image displayed in the second image display area D2 is maintained higher than the resolution corresponding to the eyesight.

However, human eyes do not always face frontward, and the sightline direction of the eyes changes. For example, in a case where a person reads a book, that is, in a case where letters or numerals present within a certain viewing angle range are read, the sightline direction is believed to slightly change over the range where the letters and the like are present. In this case, it is believed that the angle of the sightline direction changes, for example, by about an angle of 5°, and that only the eyes move but the neck or the heat does not move at all. On the other hand, for example, in a case where a person greatly changes the sightline to view an object completely different from an object the person is currently viewing, that is, the sightline direction greatly changes by an angle of at least 5°, the person first instantaneously rotates the eyes to change the sightline direction, moves the neck with delay, and moves the eyes, the neck or the head in such a way that a visual recognition target that the person desires to view is located on the center axis of the face, that is, the center of the visual recognition target is located on the posture reference axis PX1 defined in FIG. 6A.

In the present embodiment, on the basis of the operation described above, in a case where the sightline sensor SS, which is the sightline detection section, detects, as a change in the sightline direction greater than a predetermined angle, that the sightline direction changes by a large angle greater than or equal to 5°, the controller CR, which is the image control section, changes the display aspect of the image formed by the image formation apparatus 80, which forms the image display section. In the present embodiment, in particular, the controller CR changes the display aspect in correspondence with a change in the posture detected with the posture sensor GS, which is the posture detection section.

An example of the image control operation performed by the head mounted display 100 shown in FIGS. 6A and 6B in accordance with the viewer's movement will be described below with reference to FIG. 7. FIG. 7 shows states A1 to A3 corresponding to FIG. 6A as follows: The state A1 is a state in which the viewer changes the sightline direction by moving only the eyes EY1 and EY2; the state A2 is a state in which the viewer has moved the eyes EY1 and EY2 and moves the neck or the head halfway in the direction in which the sightline direction has been changed; and the state A3 is a state in which the viewer has completed the movement of the neck or the head and aligns the sightline direction of the eyes EY1 and EY2 with the center axis of the face to achieve the state shown in FIG. 6A again. In FIG. 7, states B1 to B3 correspond to FIG. 6B and show the relationship between the direction of the sightline of the viewer's eyes EY and changes in the image display aspect in the states A1 to A3 described above, respectively.

Figure 7:
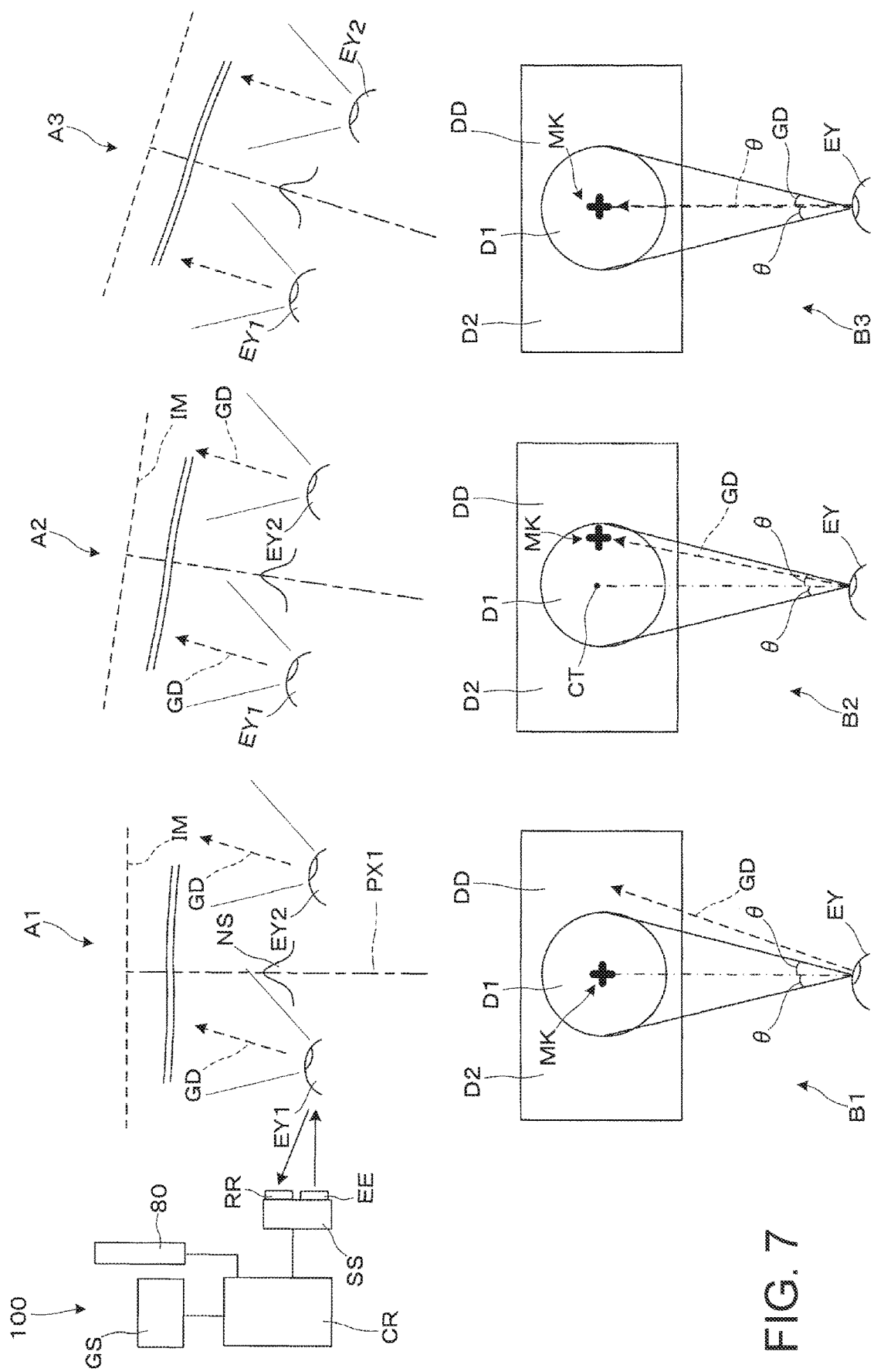
FIG. 7 shows an example of the image control operation in accordance with a viewer's movement.

As shown in FIG. 7, when the viewer first moves only the eyes EY1 and EY2 to achieve a state in which the sightline direction GD inclines with respect to the posture reference axis PX1 and the sightline reference axis GX1 by an angular difference of at least 5°, the destination of the sightline direction GD, that is, the direction of the viewer's central vision departs from the first image display area D1 and moves toward the second image display area D2, which is the peripheral area, as shown in the states A1 and B1. Thereafter, however, since the viewer moves the neck or the head, as shown in the states A2 and B2, the head mounted display 100 itself moves accordingly. That is, the angular difference between the sightline direction GD and the posture reference axis PX1 and the sightline reference axis GX1 decreases, and the destination of the sightline direction GD therefore falls within the first image display area D1. When the viewer completes the movement of the neck or the head, the state in which the sightline direction GD is aligned with the posture reference axis PX1 and the sightline reference axis GX1, that is, the states shown in FIGS. 6A and 6B are achieved again, as shown in the states A3 and B3.

In relation to aforementioned movement of the eyes, the neck, and other portions, to change the image display aspect, a variety of ways of changing the image display aspect are conceivable in accordance, for example, with an image content. For example, FIG. 7 shows an aspect in which a cross-hair mark MK is so displayed as to be in the image display area DD and as much as possible on the sightline direction GD of the eye EY. Specifically, in a typical display state, the mark MK is first displayed, for example, at the center of the image display area DD, as a precondition. That is, in a state in which the direction GD of the sightline of the viewer's eyes EY1 and EY2 naturally faces forward, the mark MK is so visually recognized as to be located at the center of the image. On the other hand, when the sightline sensor SS detects that the direction GD of the sightline of the eyes EY1 and EY2 has greatly changed by an angle of at least 5°, the controller CR checks if the posture sensor GS, which is the posture detection section, has detected a change in the posture. That is, the controller CR checks if the state A1 has changed to the state A2. As a result, the destination of the direction GD of the sightline of the eyes EY1 and EY2 has fallen within the first image display area D1, as shown in the state B2, and the controller CR, in accordance with the change, changes the display aspect of the image formed by the image formation apparatus 80 in such a way that the cross mark MK is displayed in a position at the destination of the sightline direction GD and subsequently causes the image formation apparatus 80 to perform image processing in such a way that the mark MK gradually moves to the initial image center position in accordance with the change detected with the posture sensor GS. The situation in which the viewer can visually recognize the cross mark MK located at the destination of the sightline in the high-resolution area can be therefore maintained.

The image processing described above is an example for causing an image to be displayed always at the destination of the sightline, and a variety of other types of control are conceivable. For example, the image processing may be so performed that the mark MK is always located in the same position relative to an outside image. Still instead, for example, the image processing may be so performed that after movement of the neck or the head is detected, the image is changed after the movement with intentional delay. The shape and the position of the mark MK are presented by way of example, and an image other than a cross hair may be displayed, or a shape other than a cross hair may be employed. Further, the sightline direction may be indicated by an object similar to the mark MK. In a case where no image representing the sightline direction, such as the mark MK, is displayed, for example, an image for allowing the viewer to recognize that the sightline has moved out of the central area may be displayed, or the color of the image may be changed to allow the viewer to recognize the change.

It is, however, noted that in any of the changes in the display aspect, in the case where the sightline moves, the display aspect may not be changed in accordance only with the movement of the sightline, but the movement of the sightline may be detected, followed by detection the movement of the neck or the head on the basis of the detected movement of the sightline, and the display aspect of an image may be changed in accordance with results of the detection, whereby the image can be changed more naturally for the viewer and with less burden on the viewer.

In the situation described above, in a case where the change in the sightline direction GD is so small, for example, smaller than 5°, that the destination of the sightline direction GD stays within the first image display area D1, no aforementioned change in a displayed image is made unlike the case described above, but the image can be continuously displayed with no change because it is believed that the viewer only moves the sightline but does not move the neck or the head. That is, in this case, the controller CR does not particularly perform image processing in response to the detection performed by the posture sensor GS in a case where a result of the detection performed by the sightline sensor SS is a change smaller than 5°.

Further, as for image contents, in the case of a video recorded medium, which is viewed on a fixed screen, such as a movie and a television program, the screen is not typically moved in accordance with the sightline movement. In this case, the screen movement is therefore restricted. The screen movement is restricted depending on an image content, as described above. Further, in the case of a large display range, and in the case of any of the image contents described above, the size of the image content on the screen may be changed in accordance with the type of the image content, for example, the display area is changed to be smaller than or equal to a predetermined range (equivalent to 80 inches, for example).

Further, in a case where an image is truncated or otherwise changed when the image is moved, the image may be so redrawn that the truncated portion is compensated. Instead, only the outside may be viewed in the see-through observation through the truncated portion.

As described above, in the head mounted display 100 according to the present embodiment, in the first display apparatus 100A or the second display apparatus 100B, which forms and displays an image, an image is displayed with central resolution higher than peripheral resolution or the peripheral resolution is not necessarily high resolution, and the controller CR changes the display aspect of the image formed by the image formation apparatus 80, which forms the first display apparatus 100A or the second display apparatus 100B, in accordance with a change in the sightline detected with the sightline sensor SS. As a result, satisfactory visual recognition of an image can be maintained with the head mounted display 100 simplified and reduced in size. That is, employing the method described above allows the viewer to recognize an image that causes the viewer to think that the image has sufficiently high resolution even in the configuration in which the peripheral resolution achieved by the optical system drops as described above.

Second Embodiment

Figure 8:
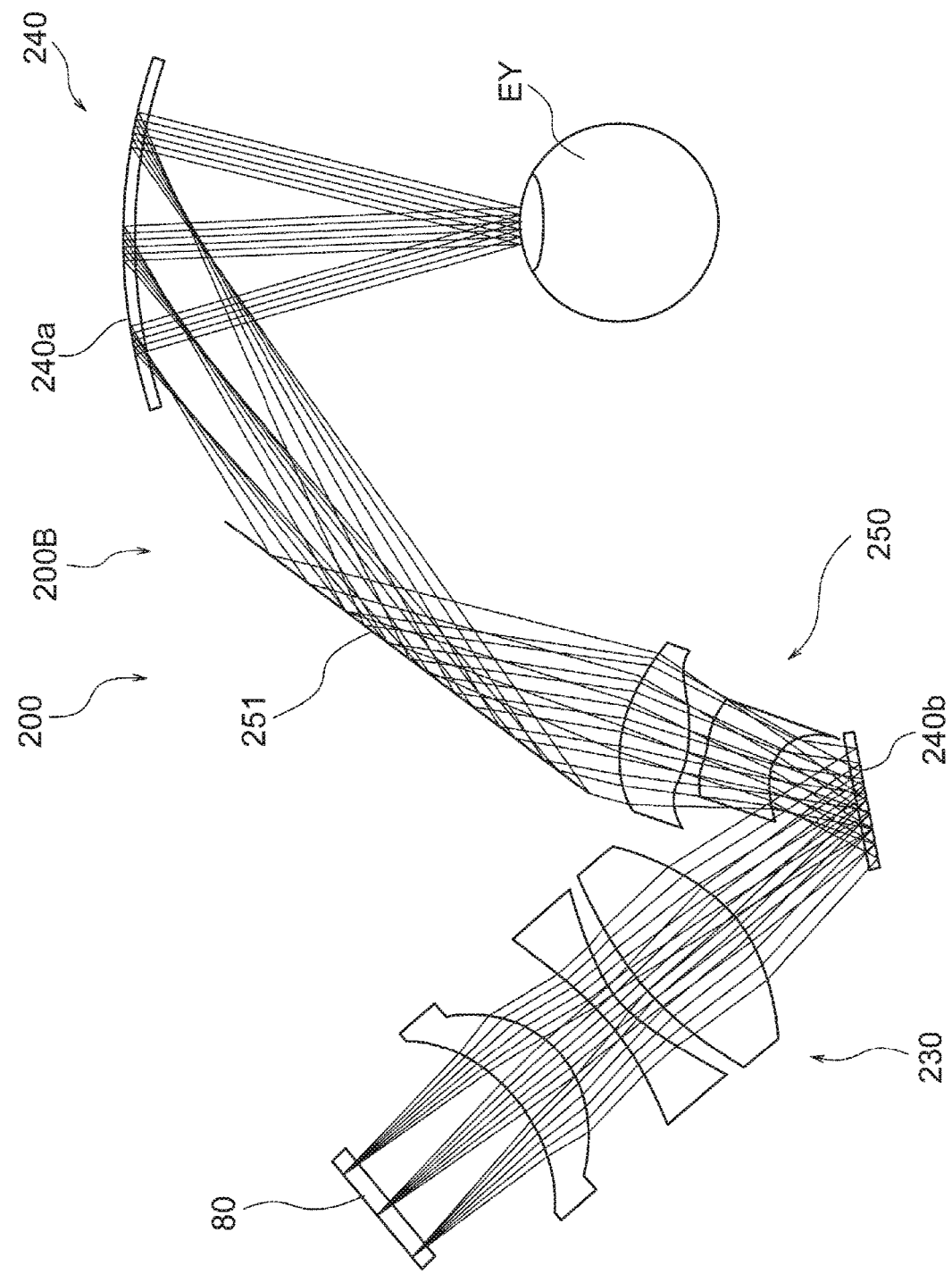
FIG. 8 describes an example of a head mounted display according to a second embodiment.

A head mounted display according to a second embodiment will be described below with reference to FIG. 8. The present embodiment differs from the first embodiment in that the head mounted display uses a hologram element to display an image. The head mounted display according to the second embodiment is formed of a pair of right and left display apparatus, and only one of the right and left display apparatus still functions as a display apparatus, as in the first embodiment, and other similarities are present between the first and second embodiments. Therefore, also in a head mounted display 200 according to the present embodiment shown in FIG. 8, only the left side is shown, and the right side will not be illustrated or described.

In the head mounted display 200 according to the present embodiment, a display apparatus 200B includes the image display apparatus 80, which forms the video light, an image forming projection lens 230, which is, for example, accommodated in a lens barrel and formed of a plurality of lenses, and a light guide apparatus 220, which guides the video light having exited from the image display apparatus 80 and passed through the projection lens 230. The light guide apparatus 220 is formed of a diffraction optical system 240, a refraction optical system 250, which is formed of a plurality of prisms, and a mirror 251, which is a reflection optical system. Among them, the diffraction optical system 240 is formed of diffraction optical members 240a and 240b, which are a pair of hologram elements.

In general, in holography, a compensation hologram so configured that the angle of diffraction is highly sensitive to the wavelength and the compensation hologram compensates a display hologram with respect to the wavelength is used. In the case described above, the diffraction optical member 240a located on the light exiting side is the display hologram, and the diffraction optical member 240b functions as the compensation hologram that compensates the diffraction optical member 240a. To allow the pair of diffraction optical members 240a and 240b to function as a display hologram and a compensation hologram that compensates the display hologram, they need to have roughly symmetric characteristics to cancel out the properties of the two holograms. The compensation is necessary in a case where an OLED, an LED, or any other similar light source is used and is also necessary in a case where a semiconductor laser or any other similar light source is used because the angle of diffraction changes due, for example, to wavelength shift due to the temperature.

In contrast, in the present embodiment, the diffraction optical member 240a, which is, for example, a display hologram, has a curved surface, whereas the diffraction optical member 240b, which is a compensation hologram, entirely or partially has a flat surface. In general, when a compensation hologram of this type is used, for example, a central portion is exactly compensated, but a peripheral portion is not sufficiently compensated, resulting in a blurred image. In the present embodiment, however, intended image display can be performed as long as the resolution of a peripheral image is maintained to be roughly half the resolution at the center. In the case where the compensation hologram has a flat surface, the optical system is significantly readily manufactured, whereby cost reduction is achieved. Instead, it is conceivable to achieve a large screen, for example, by employing a display hologram having a curved surface.

Also in the present embodiment, satisfactory visual recognition of an image can be maintained with the head mounted display simplified and reduced in size. That is, employing the method described above allows the viewer to recognize an image that causes the viewer to think that the image has sufficiently high resolution even in the configuration in which the peripheral resolution achieved by the optical system drops as described above. In the present embodiment, in particular, the production of the holograms can be simplified.

Third Embodiment

A head mounted display according to a third embodiment will be described below with reference to FIG. 9. The present embodiment differs from the first embodiment and other embodiments in that a pixel matrix formed, for example, of a liquid crystal panel is employed as the image display apparatus that forms the image display section, and that a plurality of pixels that form the pixel matrix are particularly so configured that pixels corresponding to a central image display area, that is, the first image display area and pixels corresponding to a peripheral image display area, that is, the second image display area have different pixel structures or are controlled differently.

Figure 9:
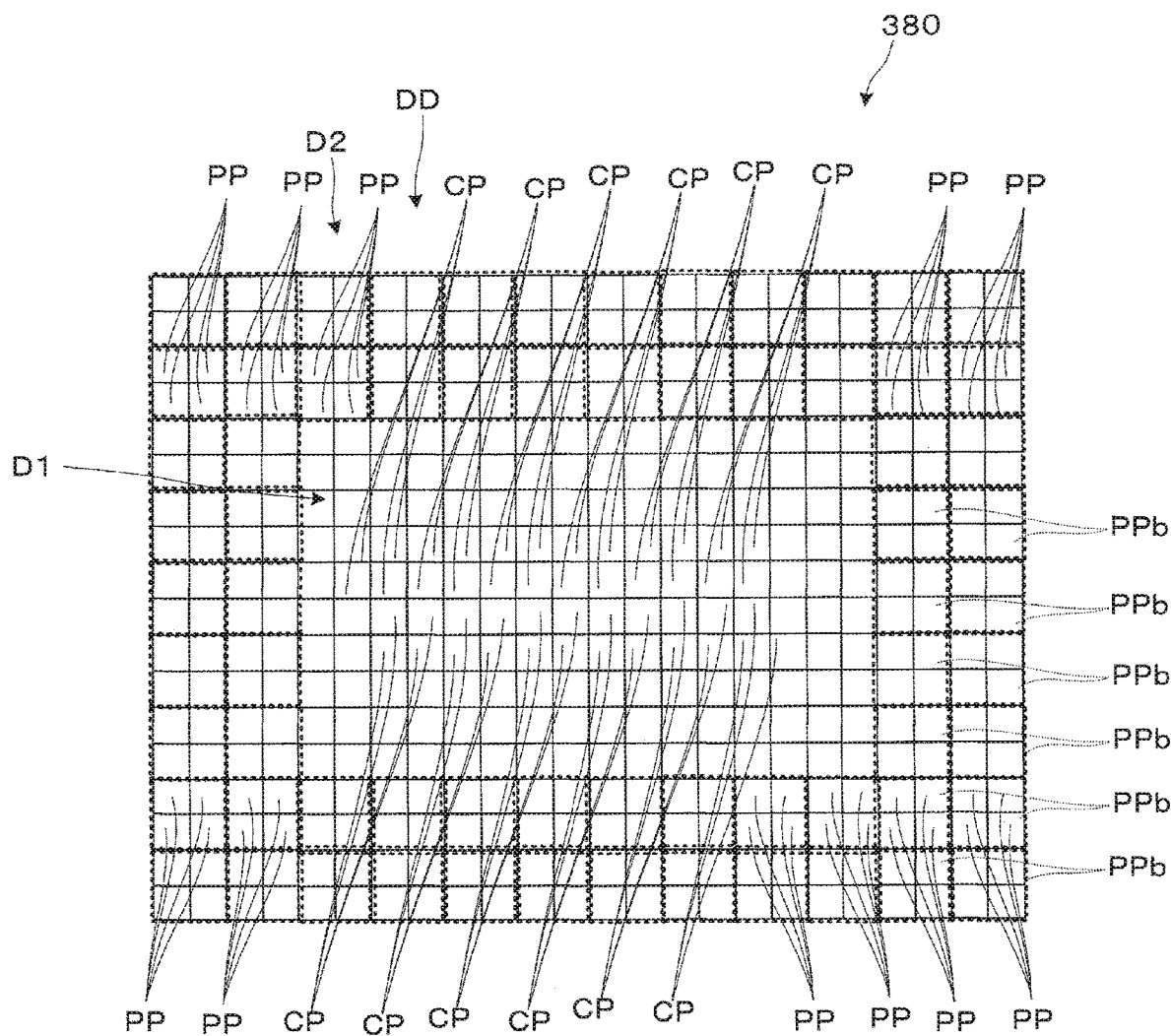
FIG. 9 describes an example of the structure of a panel that forms a head mounted display according to a third embodiment.

FIG. 9 describes an example of the structure of a panel in the image display apparatus that forms the head mounted display according to the present embodiment. In an image display apparatus 380 in the present embodiment, which has a large number of central pixels CP, CP, . . . corresponding to the first image display area, as shown in FIG. 9, the individual pixels CP, CP, . . . are separately driven. On the other hand, a large number of peripheral pixels PP, PP, . . . corresponding to the second image display area are so configured that a plurality of pixels adjacent to each other are collectively driven. Specifically, four pixels PP, PP, PP, PP are collectively driven as one pixel so as to operate in the same manner, as indicated by the dotted-line sections PPb in FIG. 9. That is, each of the driven-sets of the peripheral pixels is four times larger than each of the central pixels. FIG. 9 shows the structure of the panel, but it can be considered from the viewpoint of the correspondence between the panel and a displayed image that FIG. 9 shows the image display area DD, where an image formed by the image display apparatus is displayed. As a variation of the present embodiment, the pixels that form the second image display area D2, which is the peripheral area out of the image display area DD, may each initially be a large pixel. That is, a panel in which the range surrounded by each of the dotted-line section PPb forms a single pixel may be employed. It is, however, noted that an image formed by the pixels that form the second image display area D2 is also formed by collectively driving the pixels in such a way that at least necessary resolution determined in accordance with the eyesight in relation to the viewing angle is maintained. The panel driving burden in the image display apparatus can thus be lowered. Instead of the method based on the pixel structure including initially large pixels, in a case where an image is formed or displayed based on the control in which four pixels are collectively operated in the same manner as a single pixel, the range of the first image display area D1, where the resolution is relatively high, and the range of the second image display area D2, where the resolution is relatively low, out of the image display area DD may be adjusted as appropriate in accordance with the aspect of the pixel driving control. Further, in the example shown in FIG. 9, the first image display area D1 is a rectangular area, but not necessarily, and any of a variety of other shapes can be set by adjusting the arrangement of the central pixels PC and the peripheral pixels PP as appropriate.

In the above description, four pixels are collectively processed in the peripheral area, but not necessarily. For example, less than four pixels (two pixels, for example) may be collectively processed, or more than four pixels (nine pixels, for example) may be collectively processed.

Also in the present embodiment, satisfactory visual recognition of an image can be maintained with the head mounted display simplified and reduced in size. That is, employing the method described above allows the viewer to recognize an image that causes the viewer to think that the image has sufficiently high resolution even in the configuration in which the peripheral resolution achieved by the optical system drops as described above. In the present embodiment, in particular, the panel driving burden in the image display apparatus can be lowered.

Fourth Embodiment

A head mounted display according to a fourth embodiment will be described below with reference to FIG. 10. The present embodiment differs from the first embodiment and other embodiments in that the head mounted display according to the fourth embodiment displays an image by area scanning.

Figure 10:
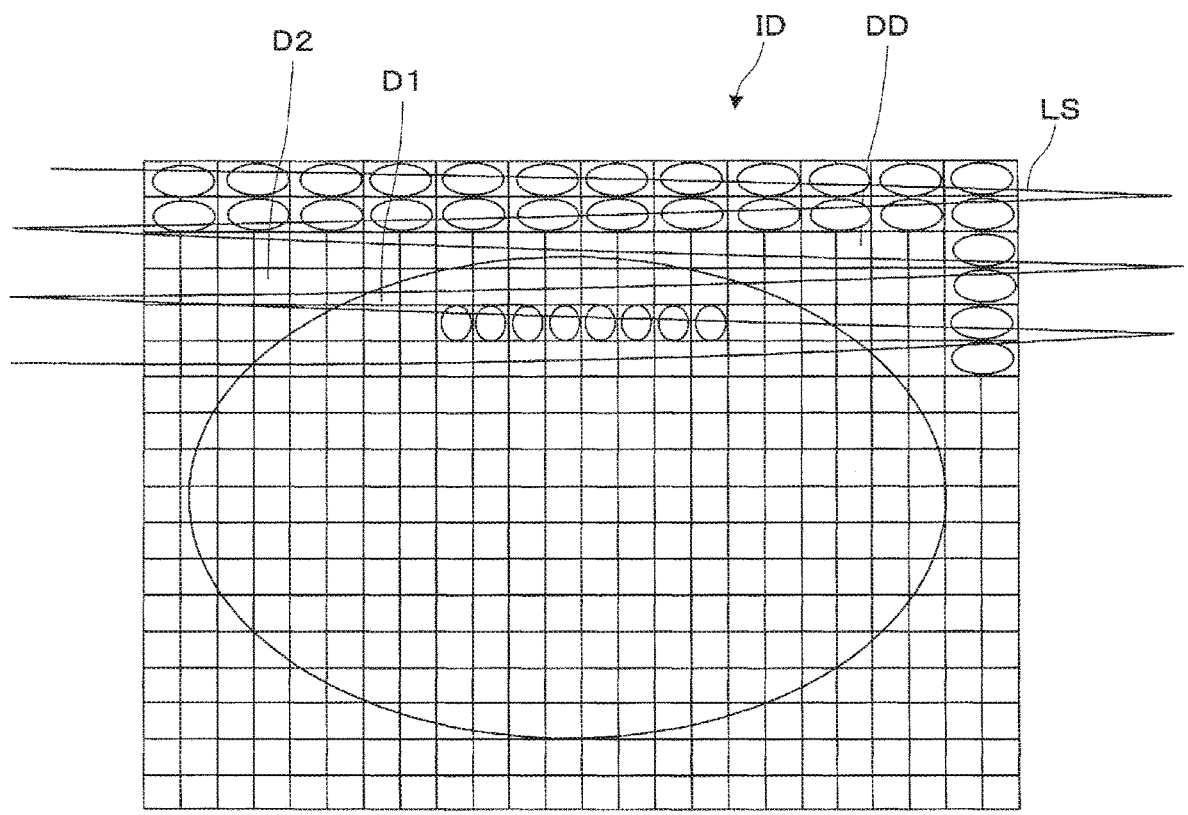
FIG. 10 describes an example of image drawing performed by a head mounted display according to a fourth embodiment.

FIG. 10 describes an example of image drawing performed by the head mounted display according to the present embodiment. In the present embodiment, in which a MEMS (not shown) performs, for example, beam scanning on an irradiated area ID with a laser beam LS, an image is formed and displayed by scanning the image display area DD in an irradiated area ID, as shown in FIG. 10. In this process, the scanning speed is adjusted in accordance with the type of image display area. Specifically, in image display based, for example, on the beam scanning, elliptical image drawing is performed by setting the single-pixel drive cycle in the peripheral area of the irradiated area ID, that is, the second image display area D2 to be longer than the single-pixel drive cycle in the central area of the irradiated area ID, that is, the first image display area D1, so that one displayed pixel is formed of two elliptical pixels adjacent to each other in the upward/downward direction, which is perpendicular to the scanning direction (rightward/leftward direction), for example, as shown in FIG. 10.

Further, in image display based, for example, on the beam scanning, the process of adjusting the color of scanning light beam may also be carried out by adjusting the scanning speed. For example, the scanning speed may be so changed that the scanning speed is reduced in the central area but the scanning speed is increased in the peripheral area, so that the amount of scanning light that enters the viewer's eyes increases in the central area and the intensity of the color increases accordingly, whereas the amount of scanning light that enters the viewer's eyes decreases in the peripheral area and the intensity of the color therefore decreases relative to that in the central area. Instead, only the process of adjusting the color of the scanning light may be carried out, for example, by light-source-side adjustment separately from the scanning speed adjustment for the resolution. Further, the scanning speed adjustment described above may be combined with the color adjustment by adjustment of the amount of light from the light source.

Also in the present embodiment, satisfactory visual recognition of an image can be maintained with the head mounted display simplified and reduced in size. That is, employing the method described above allows the viewer to recognize an image that causes the viewer to think that the image has sufficiently high resolution even in the configuration in which the peripheral resolution achieved by the optical system drops as described above. Further, in the present embodiment, depending on the type of beam scanning control, the range of the first image display area D1, where the resolution is relatively high, and the range of the second image display area D2, where the resolution is relatively low, out of the image display area DD may be adjusted as appropriate.

Others

The invention has been described with reference to the embodiments, but the invention is not limited to the embodiments described above, and the invention can be implemented in a variety of other aspects to the extent that they do not depart from the substance of the invention.

Figure 11:
FIG. 11 describes an example of display operation.

In the above description, in the case of see-through display in which an image is superimposed on an outside image OW, for example, a regular image DI1, which is displayed as a high-resolution central image, is allowed to be displayed in a variety of display methods, for example, the display aspect is changed or not in accordance with a change in the posture, as described above, whereas the image DI1 is in some cases desired to be displayed always in the same position in the image display area depending on an image content, as shown, for example, in FIG. 11. For example, an image ED1, which indicates the left direction, and an image ED2, which is so displayed as to indicate that a person is present nearby on the right side and draw a driver's attention, are desired to each be an immobile image always displayed in a fixed peripheral position. It is conceivable that the size (thickness) of objects, such as letters and marks, in a portion that is not desired to be moved is, for example, at least doubled as compared with the size in a case where the objects are displayed in the high-resolution area, such as the image DI1, in consideration of the case where the objects are disposed in the low-resolution peripheral area. As described above, the area where an attention drawing image and the like are displayed is fixed and immobile even when the sightline moves, and displayed symbols and letters relating to safety are enlarged, whereby they can be satisfactorily displayed even in the low-resolution area. As a result, even when the sightline is moved to a different location so that the visual recognition ability decreases, the viewer can immediately notice displayed safety information.

Figure 12:
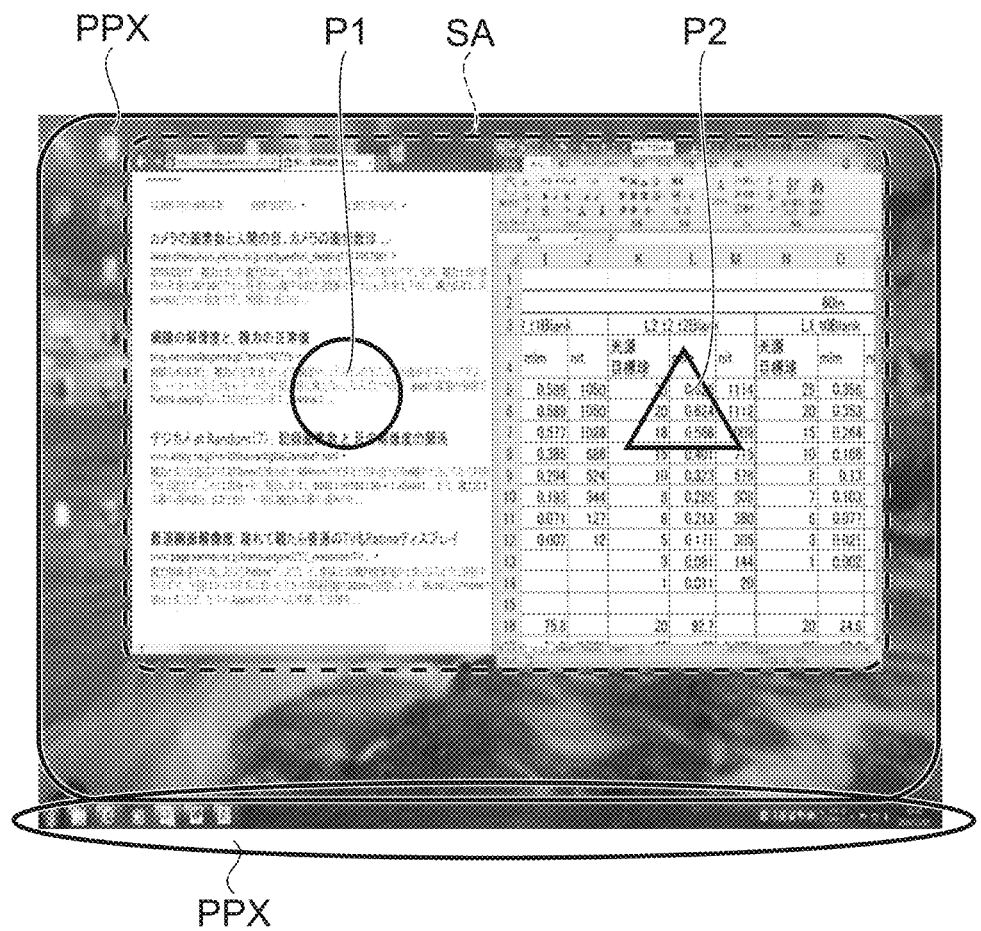
FIG. 12 describes another example of the display operation.

Further, in a work area SA of the screen of a personal computer, the display aspect in a case where the sightline direction is so moved to perform a task in a circular section P1 that the section P1 is located at the center of the screen and the display aspect in a case where the sightline direction is so moved to perform a task in a triangular section P2 that the section P2 is located at the center of the screen are set differently, as conceptually shown in, for example, FIG. 12. That is, image processing is so performed in accordance with a task that the section P1 or P2 is located at the center of the screen. On the other hand, a section PPX disposed at the periphery, such as a toolbar on the screen of the personal computer or any other screen, may be an image that is disposed, for example, at the periphery of the image display area and does not move even when the sightline is moved. As described above, the aspect in which a displayed image is changed may be changed on an area basis depending on the content to be displayed. It is noted that even when the central screen moves in accordance with a task as described above, the icon toolbar is so present as not to be truncated in the low-resolution area, whereby the viewer can switch an icon to another and recognize the time and other pieces of information displayed in the toolbar.

The image contents to be displayed are not limited to movies, television programs described above, and the other screens described above, and a desk work screen and icons displayed on a PC, a variety of pieces of information in a car or any other vehicle, and a variety of other contents are conceivable.

In the above description, only the aspect in which the image light and outside light are superimposed on each other has been described. Instead, the invention may, for example, be applied to a virtual image display that switches an aspect in which the image light and outside light are not superimposed on each other but only the image light is viewed to an aspect in which the image light and outside light are not superimposed on each other but only the outside light is viewed and vice versa.

Figure 13:
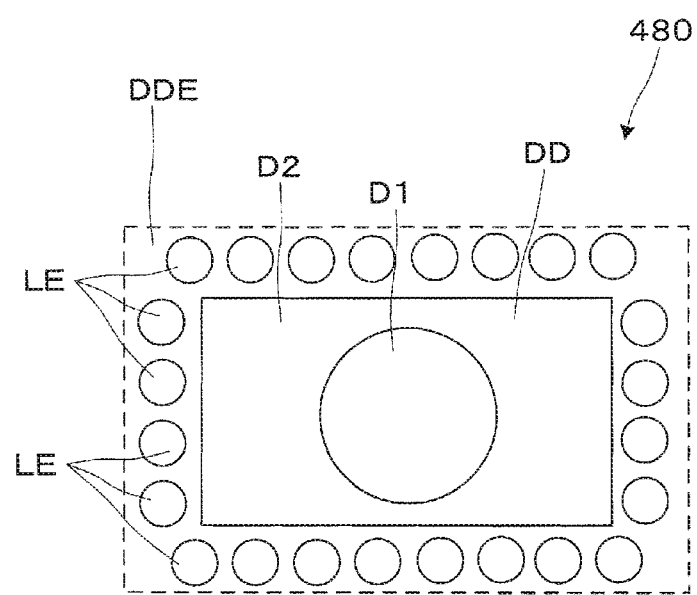
FIG. 13 shows another example of the image display.

Further, as shown, for example, in FIG. 13, which conceptually shows an example of the image display apparatus or the image display area where an image formed by the image display apparatus is displayed, an image display apparatus 480 may further provide an extended display area DDE around the periphery of the regular image display area DD and perform the display control on the entire display area including the extended display area DDE. In this case, for example, it is conceivable to configure the extended display area DDE in such a way that a plurality of full-color LED elements LE are arranged therein. This case is equivalent to a case where the peripheral second image display area D2 out of the image display area DD is extended.

The technology of the invention of the present application may be applied to what is called a video-see-through product formed of a display and an imaging apparatus.

In the above description, a variety of apparatus can be used as the image formation apparatus 80. For example, a configuration using a reflective liquid crystal display device is conceivable, or the video display element formed, for example, of a liquid crystal display device can be replaced, for example, with a digital micromirror device.

In the above description, the light guide member 10 and other components extend in the horizontal direction, along which the eyes EY are arranged. The light guide member 10 may instead be so disposed as to extend in the vertical direction. In this case, the light guide member 10 has a parallel arrangement structure instead of the serial arrangement structure.

In the above description, the number of optical elements (lenses) that form the projection lens, whether or not there is a prism or any other relay system that forms the light guide apparatus and other configurations, and the number of components of the light guide apparatus and other configurations can be determined in a variety of manners.

The size of the pixels described with reference to FIG. 9 may instead be so changed, for example, that the size is gradually increased stepwise multiple times with distance from the center toward the periphery in the second image display area D2. The same holds true for, for example, the second image display area in FIG. 13.

The sightline direction may be detected with the sightline sensor SS not necessarily by estimating the user's sightline direction from the state of each of the eyes but, for example, by detecting the sightline direction of only a dominant eye, switching the eye in accordance with which the sightline direction is detected on the basis of the direction in which the sightline direction moves, rightward or leftward, or detecting the sightline direction of only one eye.

The entire disclosure of Japanese Patent Application No. 2017-035983, filed Feb. 28, 2017 is expressly incorporated by reference herein.

What is claimed is:

1. A head mounted display comprising:
an image display section that displays a high resolution central image in a central image display area and a low resolution peripheral image in a peripheral image display area that is outside the central image display area on the image display section, the high resolution central image having a resolution higher than a resolution of the low resolution peripheral image, the image display section covering a front side of a viewer's eye;
a sightline detection section that detects a sightline; and
an image control section that changes a display aspect of an image displayed by the image display section when the sightline detection section detects that a sightline direction of the viewer's eye has changed by an angle greater than a predetermined value, wherein
the high resolution central image displayed in the central image display area of the image display section is a circular image having an angular range between 5° and 10° with respect to an image center, the image center being a sightline reference axis corresponding to the sightline direction of the viewer's eye.

2. The head mounted display according to claim 1, wherein the image display section displays an image at resolution higher than resolution converted from eyesight corresponding to an assumed visual field of the viewer's eye.

3. The head mounted display according to claim 1, further comprising
a posture detection section that detects a posture of the head mounted display,
wherein the image control section changes the display aspect of an image displayed by the image display section in correspondence with a change in the posture detected by the posture detection section in a case where the sightline detection section detects that the sightline direction has changed by an angle greater than or equal to 5°.

4. The head mounted display according to claim 1, wherein the image control section changes how to change the display aspect of an image displayed by the image display section in response to a change in a sightline direction in accordance with an image content.

5. The head mounted display according to claim 1, wherein
the image display section has a pixel matrix, and
out of a plurality of pixels that form the pixel matrix, pixels corresponding to the central image display area and pixels corresponding to the peripheral image display area have different pixel structures or are controlled differently.

6. The head mounted display according to claim 5, wherein
out of the pixels that form the pixel matrix, the image display section drives the pixels corresponding to the central image display area on a pixel basis and drives the pixels corresponding to the peripheral image display area on a pixel unit basis, the pixel unit formed of a plurality of adjacent pixels.

7. The head mounted display according to claim 1, wherein the image display section displays an image based on area scanning and adjusts a scanning speed in accordance with a type of the image display area.

8. The head mounted display according to claim 1, wherein the image display section displays an image by using a hologram element.

9. An image formation optical system that forms a high resolution central image in a central image display area of an image display section and forms a low resolution peripheral image in a peripheral image display area that is outside the central image display area on the image display section,
the image display section covering a front side of a viewer's eye,
the high resolution central image having a resolution higher than a resolution of the low resolution peripheral image, according to a change in eyesight in relation to a visual field of the viewer's eye, wherein:
the high resolution central image displayed in the central image display area of the image display section is a circular image having an angular range between 5° and 10° with respect to an image center, the image center being a sightline reference axis corresponding to a sightline direction of the viewer's eye; and the resolution of the low resolution peripheral image is set to be higher than resolution converted from the eyesight corresponding to an assumed visual field of the viewer's eye.

10. A head mounted display comprising the image formation optical system according to claim 9.

11. The head mounted display according to claim 1, wherein the image display section covering the front side of the viewer's eye allows a see-through observation while displaying the image.

12. The head mounted display according to claim 1, wherein the resolution of the low resolution peripheral image in the peripheral image display area is equal to or less than half the resolution of the high resolution central image in the central image display area.

13. The head mounted display according to claim 1, wherein the display aspect of the image displayed by the image display section is changed (i) when the sightline detection section detects that the sightline direction has changed by an angle greater than the predetermined value, and (ii) in accordance with a detected change in a posture of a viewer.

14. The head mounted display according to claim 1, wherein the head mounted display is a video-see-through device.

* * * * *